United States Patent
Liu et al.

(10) Patent No.: US 9,049,312 B2
(45) Date of Patent: Jun. 2, 2015

(54) INTERACTIVE TOOL FOR INCORPORATING USER INPUT AND FEEDBACK IN IMAGE QUALITY RELATED DIAGNOSIS

(75) Inventors: Juan Liu, Miliptas, CA (US); Robert Price, Palo Alto, CA (US); Eric S. Hamby, Webster, NY (US); Rajinderjeet S. Minhas, Churchville, NY (US)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 281 days.

(21) Appl. No.: 13/443,366

(22) Filed: Apr. 10, 2012

(65) Prior Publication Data

US 2013/0265594 A1 Oct. 10, 2013

(51) Int. Cl.
*G06T 5/00* (2006.01)
*H04N 1/00* (2006.01)
*H04N 1/60* (2006.01)

(52) U.S. Cl.
CPC ........ *H04N 1/00029* (2013.01); *H04N 1/00005* (2013.01); *H04N 1/00015* (2013.01); *H04N 1/00031* (2013.01); *H04N 1/00045* (2013.01); *H04N 1/00058* (2013.01); *H04N 1/6038* (2013.01)

(58) Field of Classification Search
CPC ........ G06K 5/00; G06T 7/0022; B41J 2/2132
USPC .......... 358/1.9, 1.6, 3.26, 3.27, 538; 382/275, 382/311
See application file for complete search history.

(56) References Cited

U.S. PATENT DOCUMENTS

| | | | |
|---|---|---|---|
| 5,305,119 A | 4/1994 | Rolleston et al. | |
| 5,528,386 A | 6/1996 | Rolleston et al. | |
| 5,612,902 A | 3/1997 | Stokes | |
| 5,818,960 A | 10/1998 | Gregory, Jr. et al. | |
| 6,005,670 A | 12/1999 | Coleman | |
| 6,304,278 B1 | 10/2001 | Coleman | |
| 6,341,020 B1 | 1/2002 | Rumph et al. | |
| 6,393,161 B1 | 5/2002 | Stevenson et al. | |
| 6,522,431 B1 | 2/2003 | Pitts et al. | |
| 6,571,000 B1 | 5/2003 | Rasmussen et al. | |
| 6,809,837 B1 | 10/2004 | Mestha et al. | |
| 6,972,783 B2 | 12/2005 | Takamatsu et al. | |

(Continued)

OTHER PUBLICATIONS

Gaurav Sharma, Wencheng Wu, Edul N. Dalal, "The CIEDE2000 Color-Difference Formula: Implementation Notes, Supplementary Test Data, and Mathematical Observations", Submitted to Color Research and Application, Feb. 9, 2004.

(Continued)

*Primary Examiner* — Jamares Q Washington
(74) *Attorney, Agent, or Firm* — Fay Sharpe LLP (57) ABSTRACT

The presently disclosed embodiment provides an interactive tool for printed image artifact characterization that successfully combines the advantages from both a human visual system and automated image quality characterization. In the interactive tool provided, the user may specify coarse level information, such as the region of interest in a print image, to be examined by the automated image-quality characterization algorithm, which can then employ sophisticated algorithms, e.g. signal processing, feature extraction, estimation and classification, to find precise fine-level descriptors.

10 Claims, 8 Drawing Sheets

(56) References Cited

U.S. PATENT DOCUMENTS

| | | |
|---|---|---|
| 7,305,194 B2 | 12/2007 | Thayer |
| 7,347,525 B2 | 3/2008 | Mizes |
| 7,388,989 B2 | 6/2008 | Wang |
| 7,424,169 B2 | 9/2008 | Viassolo et al. |
| 7,433,539 B2 | 10/2008 | Wang et al. |
| 7,528,997 B2 | 5/2009 | Gusmano et al. |
| 7,542,171 B2 | 6/2009 | Viassolo et al. |
| 7,643,678 B2 | 1/2010 | Mizes |
| 2005/0036705 A1 | 2/2005 | Viassolo et al. |
| 2005/0254097 A1 | 11/2005 | Schweid et al. |
| 2006/0001911 A1 | 1/2006 | Viassolo et al. |
| 2006/0077488 A1 | 4/2006 | Zhang et al. |
| 2006/0110060 A1 | 5/2006 | Wang et al. |
| 2007/0195351 A1* | 8/2007 | Mashtare et al. ............ 358/1.13 |
| 2008/0239344 A1 | 10/2008 | Wang et al. |
| 2009/0002724 A1* | 1/2009 | Paul et al. ...................... 358/1.1 |
| 2009/0003729 A1 | 1/2009 | Metcalfe et al. |
| 2009/0202170 A1* | 8/2009 | Weiss ............................ 382/275 |
| 2009/0273813 A1 | 11/2009 | Viturro et al. |
| 2009/0296158 A1 | 12/2009 | Paul et al. |
| 2010/0092096 A1 | 4/2010 | Bernal et al. |
| 2012/0033238 A1 | 2/2012 | Liu |

OTHER PUBLICATIONS

Gaurva Sharma, Digital Color Imaging Handbook, CRC Press.
Swati Bandyopadhyay, Tapan Paul, Tapasi Roychowdhury and Sivaji Bandyopadhyay, "A new model of printer characterization", IS&T's NIP20: 2004 International Conference on Digital Printing Technologies.
Raja Balasubramanian, The use of spectral regression in modeling halftone color printers, Journal of Electric Imaging, Apr. 1999, vol. 8(2).
Raja Balasubramanian, "Colorimetric modeling of binary color printers", pp. 1-4.
Jon Yngve Hardeberg and Francis Schmitt, Color Printer characterization using a computational geometry approach.
Raja Balasubramanian, "A spectral neugebauer model for dot-on-dot printers," pp. 1-11.
De Kleer, J., & Williams, B.C. (1987). "Diagnosing Multiple Faults", Artificial Intelligence (32), 97-130.
Duke, C.B., Noolandi, J., & Thieret, T. (2002). The surface science of xerography. Surface Science (500), 1005-1023.
Liu, J., De Kleer, J. Kuhn, L., Price, B., Zhou, R., & Uckun, S. (2008). "A unified information criterion for evaluating probe and test selection". In International Conference on Prognostics and Health Management (PHM).
Rasmussen, D. R., Dalal, E.N., & Hoffman, K.M. (2001). "Measurement of macro-uniformity: streaks, bands, mottle and chromatic variations". In IS&T's 2001 PICS Conference Proceedings.
Rosario, H. S., Saber, E., Wu, W., & Chandu, K. (2007). "A novel algorithm for detecting streaks in mottled and noisy images", Journal of Electronic Imaging, 16.
S. Mallat and Z. Zhang, "Matching pursuits with time-frequency dictionaries", IEEE Trans. Signal Processing, vol. 41, pp. 3397-3415, Dec. 1993.
S. Chen and D. Donoho, "Basis pursuit", in Proc. $28^{th}$ Asilomar Conf. Signals, System Computation, (Asilomar, CA), pp. 41-44, 1994.
P.S. Huggins and S.W. Zucker, "Greedy basis pursuit", IEEE Trans. Signal Processing, vol. 55, pp. 3760-3772, Jul. 2007.
P. Du, W. A. Kibbe, and S.M. Lin, "Improved peak detection in mass spectrum by incorporating continuous wavelet transform-based pattern matching", Bioinfomatics, vol. 22, No. 17, 2006.
J. Liu and P. Moulin, "Complexity-regularized image denoising", in Proc. of ICIP '97, (Santa Barbara, CA), pp. II. 370-373, Oct. 1997.

* cited by examiner

INTERACTIVE TOOL FOR INCORPORATING USER INPUT AND FEEDBACK IN IMAGE QUALITY RELATED DIAGNOSIS

INCORPORATION BY REFERENCE

The disclosure of U.S. patent application Ser. No. 12/849,863, filed Aug. 4, 2010, entitled Method And Apparatus For Characterizing Printer Streaking, by Juan Liu, is incorporated herein by reference in its entirety.

BACKGROUND

Image related problems are often observed in imaging/visualization systems, such as printers and projectors. Their diagnosis requires the capability to precisely describe the visual artifacts that are created by such system and/or equipment problems. However, characterizing visual artifacts is difficult, particularly because the characterization is often subjective, hence descriptions generated by human observers are largely qualitative, rather than quantitative. In most instances, a precise image quality description can only be provided by a knowledgeable, experienced technician who is familiar with the equipment. Conversely, automated image quality characterization tools often have difficulty in generating descriptors matching the evaluation provided by what is termed the human visual system, i.e. a visual evaluation from a skilled technician or other person based on his/her visual assessment of the artifact.

Much work has been done on image quality characterization. For instance, Xerox's Image Quality Analysis Facility (IQAF) offers a suite of tools for analyzing image artifacts, ranging from simple banding in solid color test patterns to complicated analysis in customer images. Even so, there remains a need for more precise image artifact analysis to efficiently identify artifacts and use this information to identify the source of the artifact so that the problem may be addressed.

BRIEF DESCRIPTION

One presently disclosed embodiment provides an interactive tool that successfully combines the advantages from both the human visual system and automated image quality characterization. In the interactive tool provided, the user may specify coarse level information, such as the region of interest in a print image, to be examined by the automated image-quality characterization system, which can then employ sophisticated algorithms, e.g. signal processing, feature extraction, estimation and classification, to find precise fine-level descriptors. This user input provides the focal point/region for the automated characterization algorithm. The user may provide feedback, for example, verification (e.g., "this image quality problem is important"), or invalidation (e.g., "this image quality problem is not important"), or spatial input (e.g., "this region is not important") that verifies or invalidates the automatic selection of quality concern or region of importance. In this manner, the user input, in the form first of initial coarse level information and then feedback, is used to interactively focus computational resources and the diagnosis algorithm.

Another presently disclosed embodiment provides an interactive method for characterizing printer streaks, the method including:

a. printing an image onto a printable media using a printing system in operable communication with an automated image quality artifact characterization system;

b. observing the printed image and identifying the presence of at least one image quality artifact in the image; and/or c. accessing an interactive tool and operating program integrated with the automated image quality artifact characterization system;

d. implementing a focus and selection process within the interactive tool to identify a region of the image including at least a portion of the image quality artifact for characterization;

e. running the operating program to select the identified region for characterization by the automated image quality artifact characterization system;

f. generating a density profile from the region of the image using a characterization data set within the automated image quality artifact characterization system, the density profile representing intensity and color value variation within the identified region of the image;

g. implementing a parameter selection process within the interactive tool to select descriptor parameter values to be used by the automated image quality artifact characterization system in characterization of the identified region of the image;

h. inputting the selected parameters into the operating program;

i. operating an automated image-quality characterization algorithm within the automated image quality artifact characterization system that uses the selected parameters to calculate streak characterizing values; and j. repeating steps (c)-(i) based on operator feedback from the calculations of step (i) as many times as necessary to generate a streak characterization.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

The presently disclosed embodiments provide an interactive tool that successfully combines the advantages of human observation and visual analysis with automated image quality characterization features that are less subjective. The tool provided interactively incorporates user input and feedback into the image quality characterization stage and the diagnosis stage of the automated image quality characterization process, ensuring the minimization of the subjective aspect of human visual systems. This is accomplished in the presently disclosed embodiment by providing common quantitative language for describing and comparing image quality artifacts, and including user feedback in the overall process to enable the focusing of automated computational/reasoning resources on a much smaller subset of image information, e.g., a region within an image, or a specific type of image quality artifact. As such, there is provided herein an interactive approach to the use of expert guidance, or a guided user interface (GUI) to complete an automated diagnosis task.

Using the method and interactive tool provided herein in the form of software including an implementation file that can be integrated within a streak characterization system, the method allows the user to provide input for streak characterization that is reflective of a current problem as observed by the user, allowing the user to focus the analysis accordingly. The tool takes advantage of existing artifact characterization techniques, for example that disclosed in U.S. patent application Ser. No. 12/849,863, filed Aug. 4, 2010, entitled Method And Apparatus For Characterizing Printer Streaking. Based on that or any similar system, as improved by the integration with that system of the interactive tool in accord with an embodiment hereof, artifacts or print anomalies are identified in a more focused and directed manner. The current system then operates to measure a test image from a print system to generate a characterization data set based on parameters, such as intensity and color values, observed in the test image. The characterized image may be a portion of the larger test image where the user observes the artifact to be most prominent or concentrated, for example. The characterization set is then used to generate a density profile representing variations in the test image in a cross-process direction. A processor is used to determine a descriptor parameter set, that may be selected and defined by the user, for a streak template that best approximates the density profile using a basis selection algorithm, and the density profile is updated according to the streak template and the user-defined descriptor parameter set. This process may be repeated at least one more time in order to generate a streak characterization according to the template and the descriptor set. As such, the method and system in one embodiment combines the automated earlier technology for identifying and defining individual image quality artifacts on an objective level, referred to herein as "coarse level information", for example streaks or bands, with the currently disclosed interactive automated tool that provides for the integration of user input and feedback, to generate streak descriptors, such as location, width, intensity, and crispness of the streaks, in accord with user-selected parameters and that are focused on selected areas or regions of the test image per user input, referred to herein as "fine level information".

One embodiment disclosed relates to streak characterization of printers. However, it is understood that the disclosure finds application with regard to image quality problems in general. As such, the tool will find application not only for printer image quality diagnosis, but also for issues involving a broader range of imaging/visualization equipment, including monitors, scanners, projectors, and the like. Based on the unique combination of aspects of a more subjective human visual system, which has proven difficult to match thus far in computer algorithms, and an objective automated image quality analysis system, the interactive tool is capable of refining coarse level information to a fine level focal point using guidance of the tool with minimal user intervention.

Figure 1:
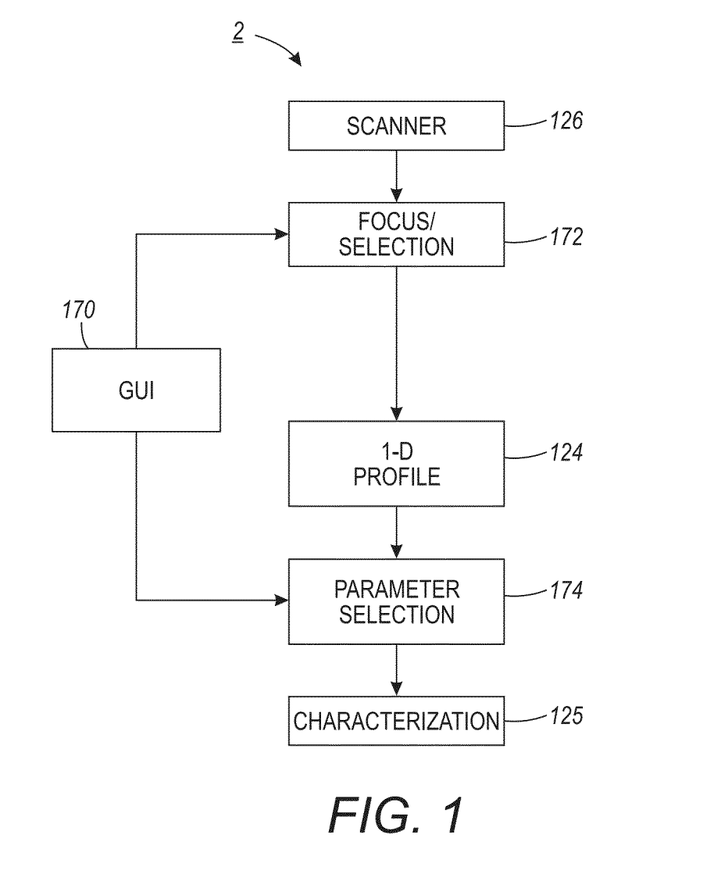
FIG. 1 is a flow diagram illustrating an exemplary printer streak characterization method in accordance with one or more aspects of the disclosure.

Referring now to the drawings, methods and systems are provided for characterizing printer streaking using a basis selection algorithm, with improvement in certain embodiments using an interactive tool combining user input and feedback integrated with automated streak characterization. The exemplary printer streak characterization method 2 of FIG. 1 is illustrated and described below in the form of a series of acts or events. However, the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated method 2, moreover, may be implemented in hardware, processor-executed software, or combinations thereof, or in distributed form in two or more components or systems, in order to characterize streaking in a printing device, and may be employed in conjunction with any form of printing system including without limitation desktop printers, network printers, stand-alone copiers, multi-function printer/copier/facsimile devices, high-speed printing/publishing systems, digital printing presses, etc., wherein the disclosure is not limited to the specific applications and implementations illustrated and described herein.

Figure 2:
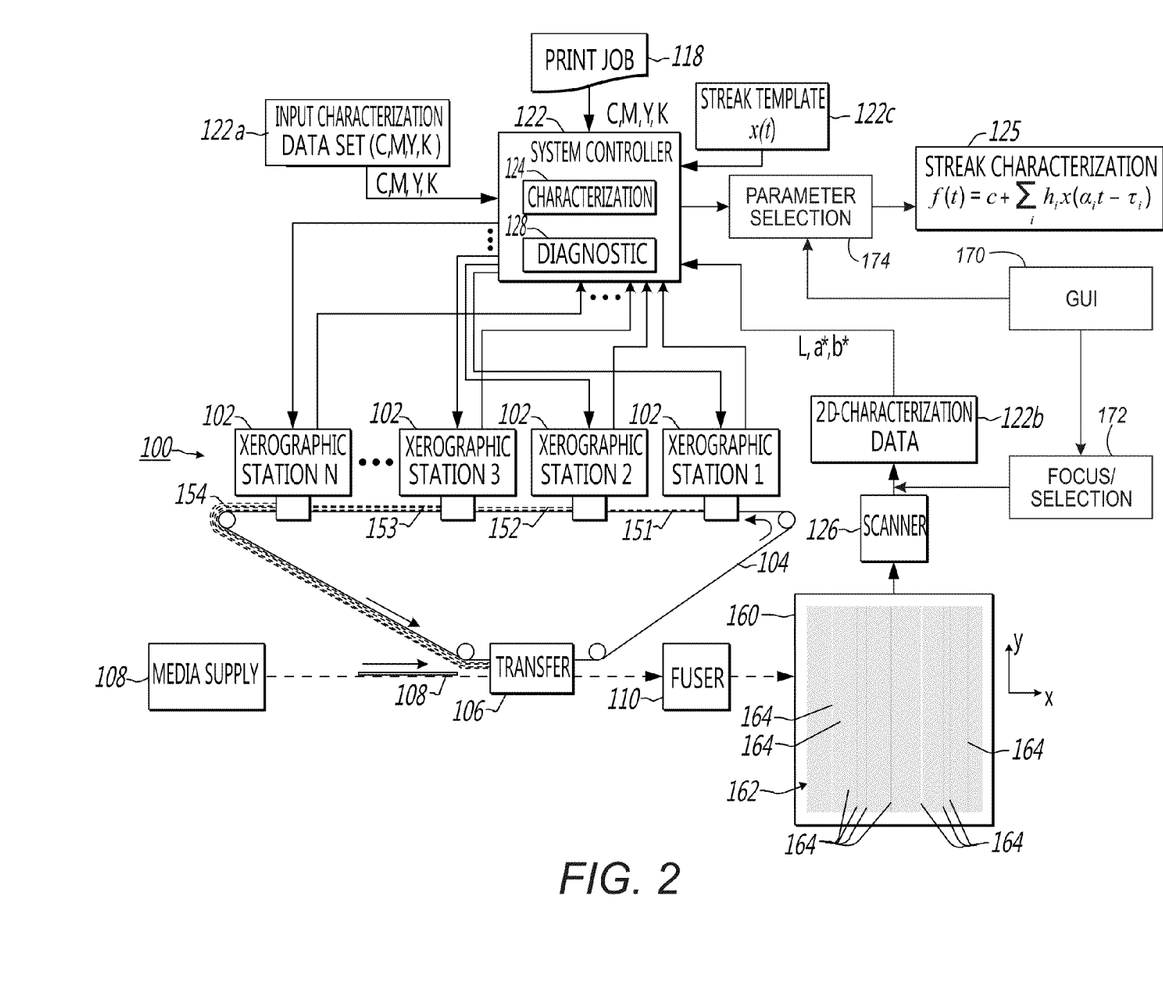
FIGS. 2 and 3 are simplified schematic system level diagrams illustrating exemplary multi-color document processing systems with a printer streak characterization system in accordance with one or more aspects of the disclosure.
Figure 3:
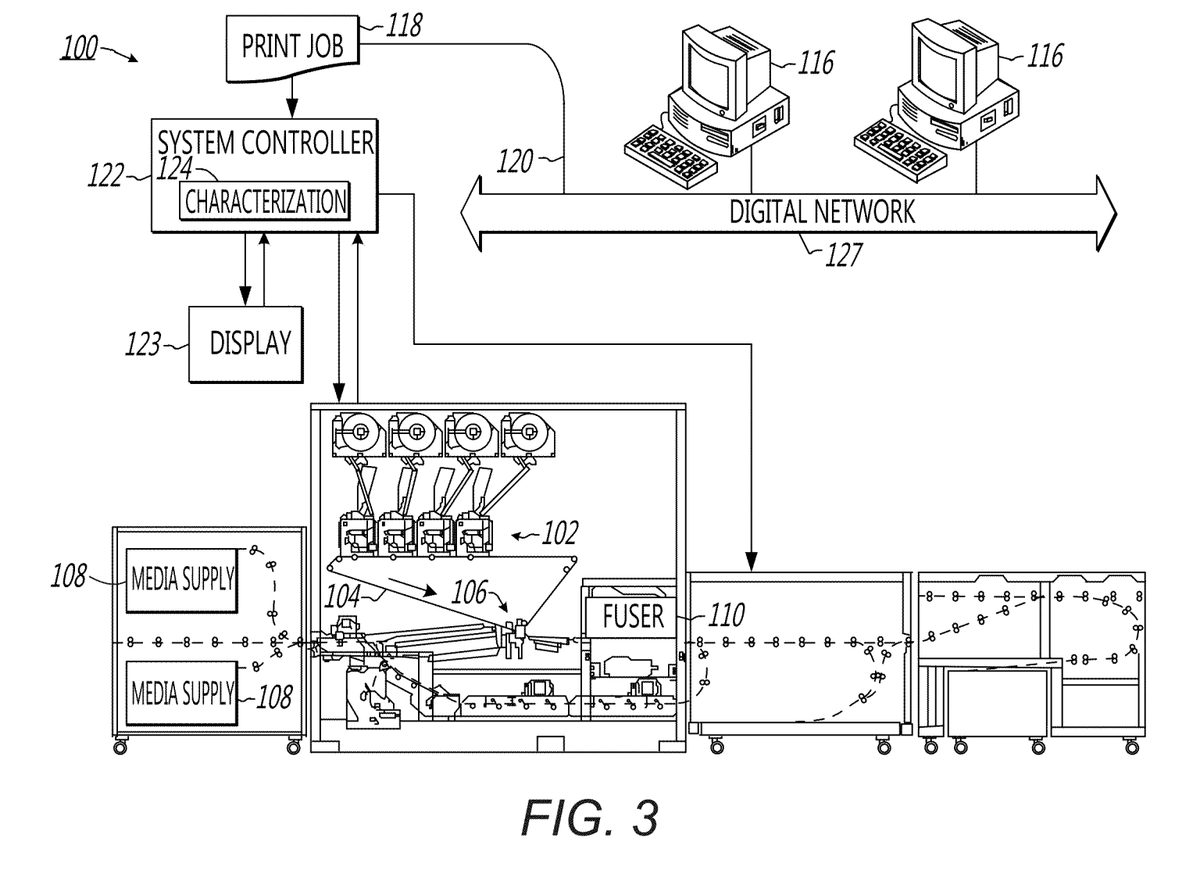
Figure 4:
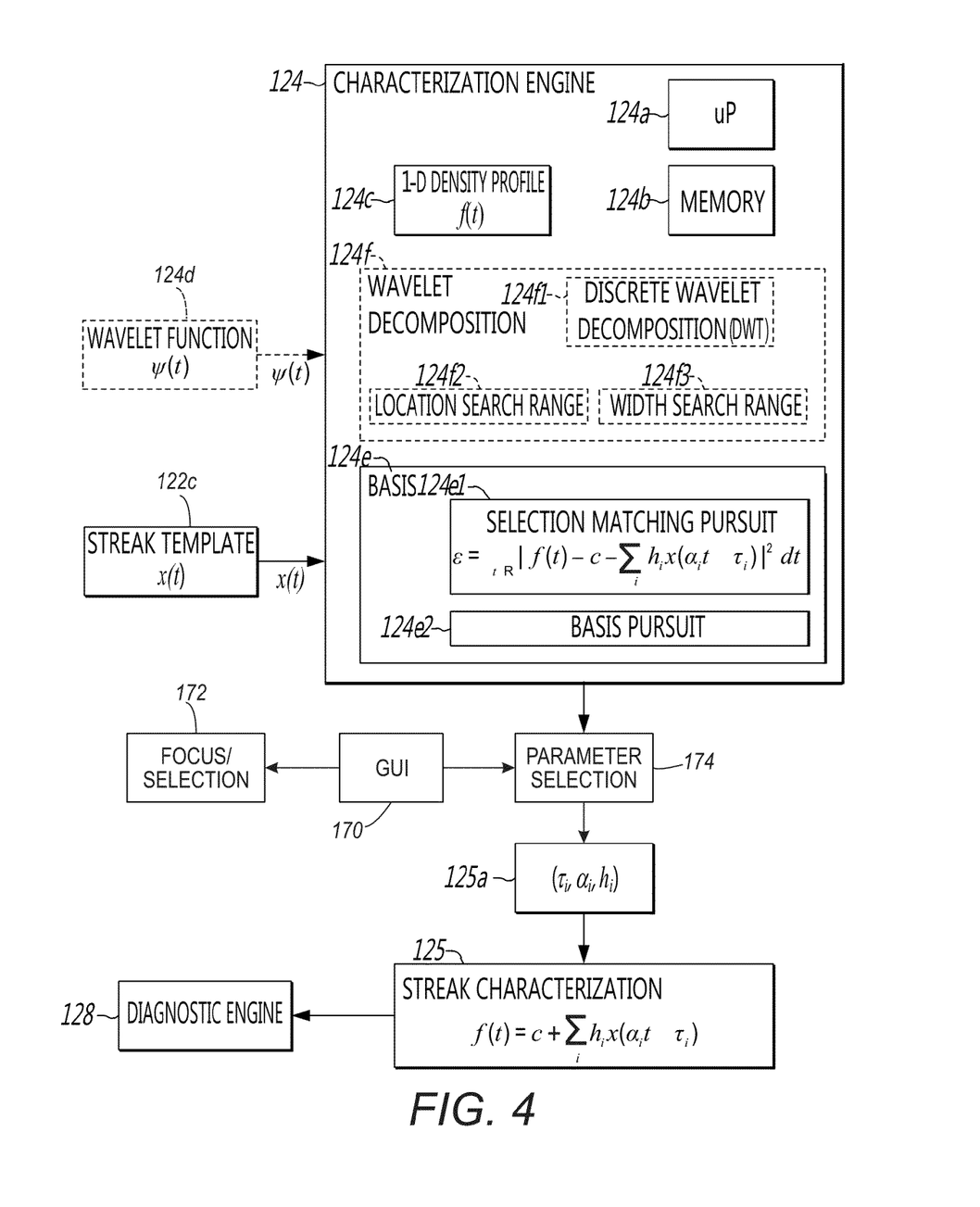
FIG. 4 is a schematic diagram illustrating further details of the streak characterization system of FIGS. 2 and 3 in accordance with one or more aspects of the disclosure.

By way of general over-view, FIG. 1 provides a flow diagram illustrating an exemplary printing system including the interactive tool as integrated into the overall streak characterization process or method 2. The interactive tool, or Guided User Interface (GUI) 170, may be implemented as a precursor to and/or as a part of a characterization system, which is set forth in more detail in FIGS. 2-4. Further, the interactive tool 170 may be a separate system or may be integrated into a printing system 100. As seen in FIGS. 2-4, exemplary printing systems or devices 100 include system controllers 122 and streak characterization systems or engines 124 that accept user input and feedback through the interactive tool 170.

With more specific reference to FIG. 1, there is provided a flow diagram of an artifact detection and analysis system including features in keeping with the currently disclosed interactive tool. System 2 identifies streaks or artifacts, and then characterizes the same using an interactive tool 170 allowing for user input and feedback as part of the image quality diagnosis, while maintaining the necessary level of objective analysis. Though not all components of the more detailed FIGS. 2-5 are shown in FIG. 1, any and all components are understood to be includable in accord with FIGS. 2-5. Now therefore, in accord with an embodiment hereof, system 2 receives a printed document (not shown) having a print pattern or printed image. If an image artifact is sensed or recognized, in one embodiment the printed image is scanned 126 and subjected to an automated interactive tool, GUI 170, for focusing and/or selecting 172 a particular area of the printed document where the artifact is located, or concentrated, as determined by a user, i.e. an operator or a technician, and focusing the streak analysis on that portion. As such, interactive tool 170 provides a mechanism for the human operator to interface with the system to select and focus coarse level information of a particular portion of the image for further analysis. The document may be scanned by scanner 126 for further characterization of the artifact. An algorithm is then performed in accord, for example, with the system disclosed in U.S. patent application Ser. No. 12/849, 863, filed Aug. 4, 2010, entitled Method And Apparatus For Characterizing Printer Streaking, to compute streak description tuples on the portion or region of the image selected using interactive tool 170/172. A 1-dimensional profile 124 of the focused portion of the image is produced. GUI 170 then again provides a mechanism for the user to interface with the system to select parameters 174 to be used in analyzing the profile 124 in order to generate a focused streak characterization 125 providing fine level information particular to the identified streak or artifact. In one embodiment, the result of the interactive analysis is used to identify streaks or artifacts on the basis of descriptors, such as location, height, and width. The final characterization, or diagnosis, 125 of the print artifact can then be transmitted to, for example, a diagnostics engine 128, or be employed by an operator or technician, to identify potential or actual sources of the print image artifact. This information may also be used to conduct automated reconfiguration, for testing and/or quality control, or for other useful operations regarding print image quality.

The exemplary color processing devices or printing systems 100 in FIGS. 2-3 include xerographic stations (print engines) 102 which operate to produce visible images according to input color data. The printing systems 100 also include a system controller 122 which provides input data to the print engines 102 according to a print job 118, as well as a scanner type sensor 126 that generates measured data 122b representative of the perceivable spectral content of printed visible images 162 printed onto printable media 108. is the image can be scanned by scanner 126, which in certain embodiments may be integrated into the printing system 100 for in-line scanning of printed images 162 on test pages 160 followed by assessment using interactive tool (GUI) 170 that allows a system user to identify a particular portion of the printed image, whether a test image or otherwise, to become the focus region of the characterizations process. The system 100 in FIG. 2 is a tandem multi-color document processing device with marking devices 102 individually operable according to control signals or data from the controller 122 to transfer toner marking material 151-154 onto an intermediate substrate 104 that may or may not be a photoreceptor, in this case, a shared intermediate transfer belt (ITB) 104 traveling in a counter clockwise direction in the figure past the xerographic marking devices 102 (also referred to as marking engines, marking elements, marking stations, etc.). In other embodiments, a cylindrical drum may be employed as an intermediate transfer substrate, with the marking devices 102 positioned around the periphery of the drum to selectively transfer marking material thereto. In addition, this could be used for other marking or display technologies, such as ink jet, DRT, LCD, projectors, etc.

FIG. 3 shows another exemplary system 100 having four marking devices 102 configured along a shared or common intermediate transfer belt 104, along with a transfer station 106, a supply of final print media 108, and a fuser 110. In normal operation, print jobs 118 are received at the controller 122 via an internal source such as an in-line or outboard scanner 126 (FIG. 2) and/or from an external source, such as one or more computers 116 connected to the system 100 via one or more networks 127 (FIG. 3) and associated cabling 120, or from wireless sources. The print job execution may include printing selected text, line graphics, images, magnetic ink character recognition (MICR) notation, etc., on the front and/or back sides or pages of one or more sheets of paper or other printable media. In this regard, some sheets 108 may be left completely blank in accordance with a particular print job 118, and some sheets may have mixed color and black-and-white printing. Execution of the print job 118, moreover, may include collating the finished sheets 108 in a certain order, along with specified folding, stapling, punching holes into, or otherwise physically manipulating or binding the sheets 108. In certain embodiments the system 100 may be a stand-alone printer or a cluster of networked or otherwise logically interconnected printers with an associated display 123 (FIG. 3), with each printer having its own associated print media source 108 and finishing components including a plurality of final media destinations, print consumable supply systems and other suitable components. Alternatively the system may include multiple marking engines 102 with a common media supply 108 and common finishers that are configured either serially or in parallel (separate parallel paper paths between feeding and finishing).

Referring also to FIG. 4, a characterization system or characterization engine 124 is operatively coupled with (and may be implemented integrally to) the system controller 122 and the controller 122 may further include a diagnostic component or engine 128 (FIGS. 2 and 4). In certain embodiments, the characterization system 124 receives 2-D characterization data for a user selected portion or region 172 of a printed image 162, in accord with user input from GUI 170. In addition, GUI 170 further provides for user input or feedback 174 with regard to descriptor parameters used to focus the characterization process. GUI 170 along with implementation units or segments 172/174 may be integrated into the characterization system as a processor-based system having suitable processing and memory components programmed or configured to implement the interactive GUI 170 tool into the process 2 and other functionality as described herein.

Figure 6:
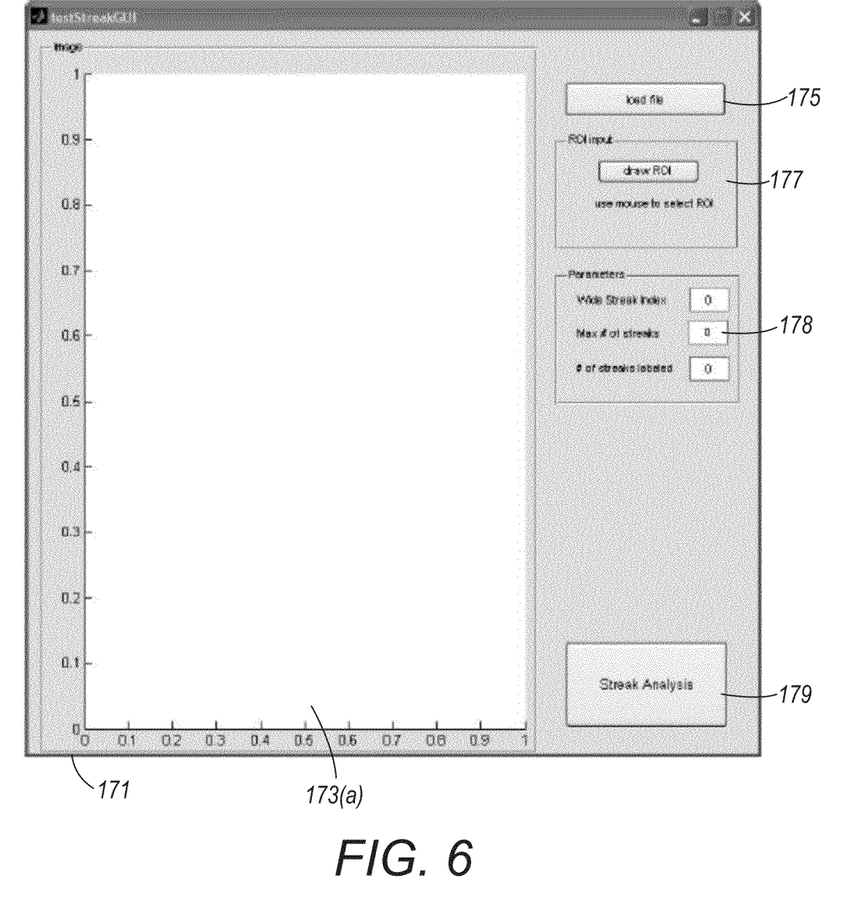
FIG. 6 is an image of a computer or processor screen within the interactive tool in accordance with one or more aspects of the disclosure.
Figure 7:
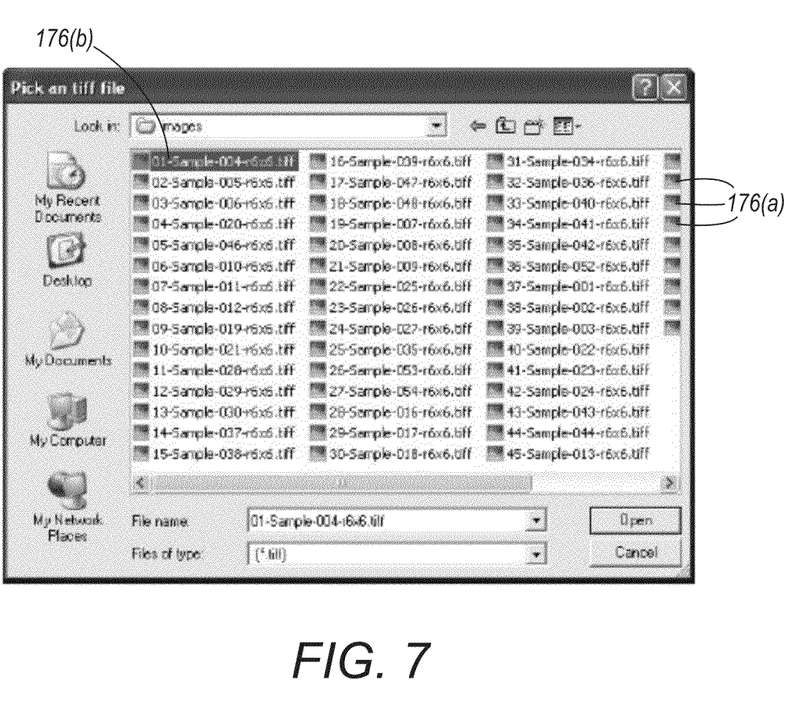
FIG. 7 is an image of a menu box, within the interactive tool, from which an image is selected.
Figure 8:
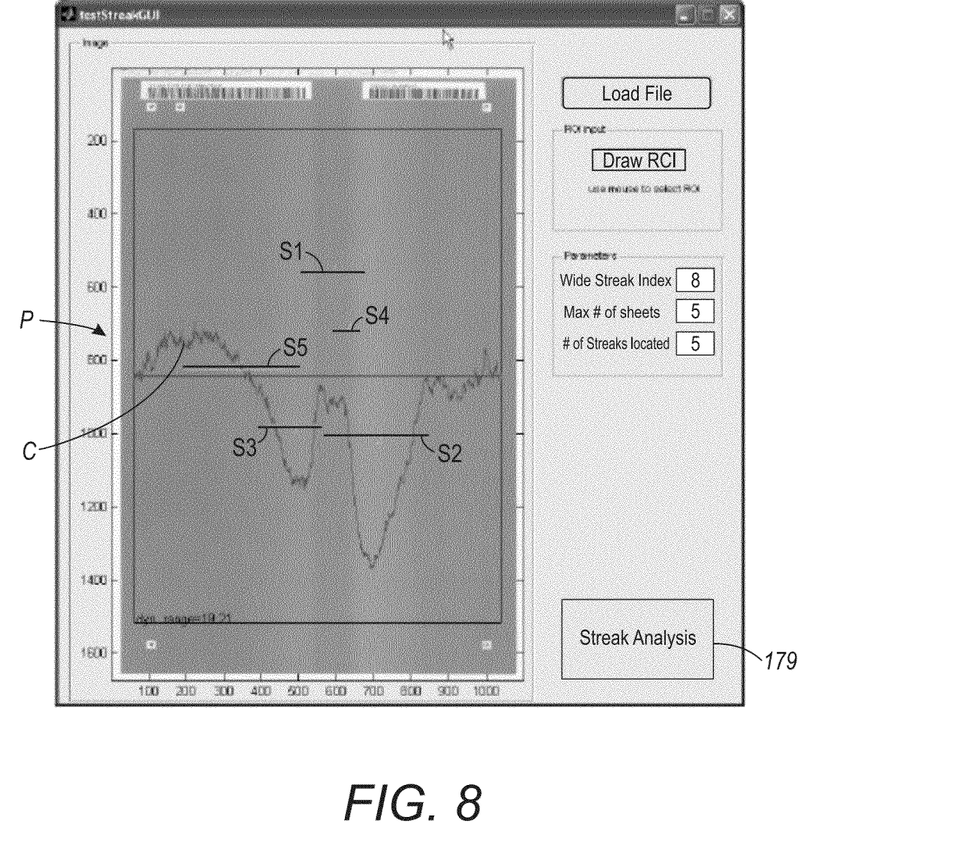
FIG. 8 is an image of a computer or processor screen of FIG. 5 including parameters and a streak analysis in accordance with one or more aspects of the disclosure.

As best shown in FIG. 4, the characterization system 124 includes a processing element 124a and memory 124b and employs suitable program instructions and/or dedicated or programmable logic to perform the streak characterization functionality described herein, and may perform other tasks. In operation, the streak characterization system 124 receives a characterization data set 122a (FIG. 2). In certain embodiments, the input characterization data set 122a is a uniform selected color or gray scale shade for printing one or more ideally uniform test patch images 162 onto a test page 160 (FIG. 2) for characterizing streaking problems in the printing system 100. Also included is GUI 170, shown more clearly in FIG. 5, which includes processing elements 170a and programmable logic 170b, employing suitable program instructions, as shown in FIGS. 6-8, dedicated to accept and implement user defined instruction, including selection and focusing 172 of a particular portion of image 162 and selection of particular descriptor parameter values 174 that allow for user input and feedback to the characterization system 124 such that the streak characterization 125 is more focused. Thus, for the case of no printer streaking or banding, the test patch 162 may not require user focusing as it should appear on the printed test page 160 as a uniform patch. However, as shown in FIG. 2, if the printing system 100 suffers from one or more streak-causing problems, the printed image 162 includes one or more visible streaks 164 extending along the process direction (vertical streaks along the "y" direction in FIG. 2), where the streaks may be lighter or darker than the desired color or shade of the input characterization data set 122a, and may have different widths along a cross-process direction (e.g., the "x" direction in FIG. 2) which is transverse to the process-direction. Here, the user may focus the characterization process by selection of a particular portion of image 162, and by further defining the descriptor parameters 174 used to characterize the focused portion of image 162.

Figure 5:
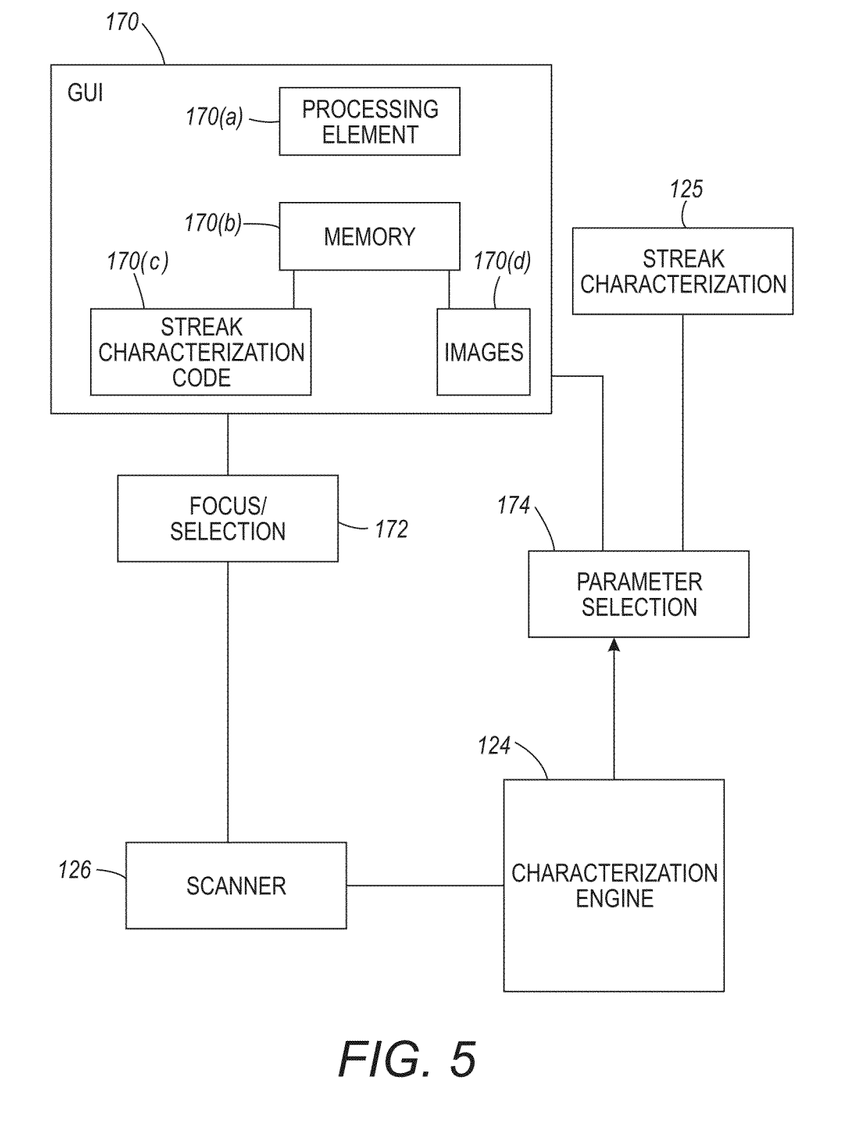
FIG. 5 is a schematic diagram illustrating further details of the streak characterization system of FIGS. 2 and 4 in accordance with one or more aspects of the disclosure.

As seen in FIGS. 2 and 4, the interactive tool, or GUI 170, as also shown in FIG. 5, may be integrated into the system 100 to allow the user to focus 172 the system by selecting a particular portion of the test image 162 to be further analyzed. By allowing the user to make this selection, and to further provide input to focus the descriptor parameters 174, the analysis can be tailored to provide a highly specific level of streak characterization, or fine level information.

The scanner 126 (FIG. 2) scans printed test image 162 and provides a two-dimensional (2-D) measured characterization data set 122b which represents coarse level information measurements of observed intensity or color. In the examples of FIGS. 2-4, the image 162 is measured to generate the measured characterization data set 122b, which is provided to the characterization system 124 as shown in FIG. 4.

Referring to FIG. 4, the characterization system 124 in FIG. 4 is also provided with a streak template x(t) 122c (e.g., defining a template waveform such as a raised cosine or half-cosine shape as shown in, a block-wave function, or other shape), as well as an optional wavelet function $\psi(t)$ 124d for wavelet decomposition, such as a Mexican hat-shaped function, a Daubechies-shaped wavelet function, or other suitable function for performing optional wavelet decomposition. In certain embodiments, a wavelet function is selected which has a similar shape to that of the streak template x(t).

As best seen in FIG. 4, the characterization system 124 in certain embodiments includes various data and functional components that may be implemented using the processor 124a and the memory 124b, including a one-dimensional (1-D) density profile 124c derived from the 2-D measured characterization data set 122b (FIG. 2) using averaging or integration in certain embodiments and representing color value variation of the portion of test image 162, selected by focus and selection operation 172, in the cross-process direction (x) of the printing system 100, as well as a basis selection component 124e and an optional wavelet decomposition component 124f. The basis selection component 124 can implement one or more basis selection algorithms for determining descriptor parameter sets 125a (tuples($\tau,\alpha,h$)) to characterize printer streaking using matching pursuit 124e1, basis pursuit 124e2, or other basis selection techniques. The descriptor parameter selection 174 may be determined based on GUI 170 user input. The optional wavelet decomposition component 124f includes a discrete wavelet decomposition component 124f1 (discrete wavelet transform or DWT) which can be advantageously employed in certain embodiments to expedite the basis selection by identifying location search ranges 124f2 and 124f3 for location and width parameters. The characterization system 124 provides a characterization 125 of printer streaking based on the tuples or sets 125a, which may then be provided to the diagnostic engine 128 as shown in FIG. 4.

Using streaks identified as described hereinabove, or by any other system or technique for identifying defects such as streaks, the current method, and particularly interactive tool/GUI 170, allows for the focusing of the artifact analysis using a combined human and automated selection process as further described herein. Therefore, the automated interactive tool in accord herewith provides a mechanism to allow human input and interaction, but to limit or minimize the subjective nature of the interaction. This is particularly important in those instances where the user identifying the focus region of the image is not a technician or operator with the skill to recognize and identify artifacts based on prior experience, but rather is, for example, a help desk or help center employee tasked with responding to a certain level of service call, or other like scenario involving less experienced personnel. Because the current tool provides an algorithm based on a specified set of descriptors, the user may identify a particular region of interest to be characterized, and the interactive tool responds by performing calculations using the descriptors that may also be identified or selected by the user. As such, the presently disclosed embodiment can be readily integrated into the system identified above, or a similar existing system, for example as shown in FIG. 1. Further, the interactive tool allows the user to repeat the analysis by selecting a different portion of the image to be focused on or by varying the parameters based on the outcome of the characterization, thus allowing the user the opportunity to assess the analysis received and provide feedback to broaden, narrow, or otherwise refine the information received.

Implementation of the interactive tool is completed by first integrating the tool as part of the overall system, and then implementing the tool to characterize the artifacts. This may be done in a dedicated processor, or may be an add-on to an existing part of the system. The GUI, 170, which may also be referred to as a Streak Characterization Tool, includes one or more directories needed to implement the analytical process using the interactive tool. One directory is the Streak/Characterization/Code, FIG. 5 170c, which contains code for characterizing streaks from scanned images.

Another directory, an Images Directory, FIG. 5 170d, and contains image files. The GUI, or streak characterization tool, 170 loads images from this directory 170d, as selected by the user, for use in performing streak characterization. It will be understood that for best results with regard to streak characterization in accord with the presently disclosed embodiment, the image having the streaks to be characterized should be aligned in the vertical direction with the printing process direction to ensure that a reliable 1-dimensional profile (average across the process direction) for streak characterization is generated for analysis.

In one embodiment, a user may access the tool 170, then StreakCharacterizationCode directory 170c, followed by selection of "testStreakGUI" to access a user screen 171 or other viewing device having an empty graph or plot 173a, as shown in FIG. 6.

The user may load the file 175 (see, for example the screen image in FIG. 6), which will then allow the user to access sample image files 176a, for example in keeping with that shown in screen image FIG. 7. The user may select an image to load from the provided menu of files, and open the selected file. For example, in FIG. 7, the first image 176b has been selected and will be loaded.

The user may next select "draw ROI" 177, shown on the upper right side of the screen image in FIG. 6, to select a region of interest of the selected image 162 (this corresponds to FIGS. 2 and 4, 172). This portion of the selection and focus tool 172 enables the user to, upon observation of the full image, draw a rectangular rubber-band box, in accord with known computer techniques, to define the perimeter of the region of interest. This results in a rectangle being added to the left-hand image panel 173(a), as viewed by the user on the screen or other viewing device.

Loading the image file automatically loads predetermined default values into the parameter panel 178, seen on the right-hand side of the screen image in FIG. 6. This parameter panel 178 is shown in FIG. 6 to default to a value 0 for each parameter. Now with reference to FIG. 8, the user may select parameter values to tailor the characterization in accord with the following 178a:

Wide streak Index—how wide a streak the user is interested in. If the value is 8, as shown in FIG. 8, this suggests that the user is interested in streaks $2^8$ pixels wide.

Max # of streaks—maximum number of streaks the algorithm searches for. 5 is the value shown in FIG. 8.

# of streaks labeled—the first few dominating streaks are labeled with a number. 5 is the value shown in FIG. 8.

Of course, the user may adjust the numbers or values to meet their requirements. For instance, if upon observation of the characterization the user determines that the detected streaks are too wide compared to human perception, the Wide Streak Index value may be decreased and the streak characterization tool can be re-run by simply implementing the "Streak Analysis" 179 as shown in the lower right-hand corner of the screen image, FIGS. 6 and 8.

Implementing the "Streak Analysis" 179 allows the user to initiate a streak characterization. This task identifies streaks within the focus region in the scanned image, and provides a visualization of the task result on the left-hand image panel 173b, as shown in FIG. 8. The image is summarized into a 1-dimensional profile, P, along the horizontal direction (i.e., cross-process direction) of the printed image. The profile appears as a wave image, which rises above and dips below the horizontal center line, C, of the image. Also shown are streaks, S, which appear as horizontal bars 1, 2, 3, 4, 5, through the wave profile. The location of a bar corresponds to the location of an identified streak, and more particularly, the length of a bar corresponds to streak width, and the height corresponds to streak intensity. Further, a bar positioned below the center line, C, generally corresponds to a light streak, while those above the center line correspond to dark streaks.

The interactive tool can be re-run as necessary to achieve a desired result. For instance, after generating a streak analysis, the sample image file screen shown in FIG. 6 may again be accessed, a new image file 176a selected, and the characterization process repeated, e.g., the user can repeat the "Draw ROI" step 177 to re-draw a region of interest, and/or modify any of the parameters 178, and then initiate the "Streak Analysis" 179 to perform a new round of streak characterization.

Even though the interactive tool is designed to minimize subjective analysis based on the perspective of a user, it can be appreciated from the foregoing that the interactive tool nonetheless affords the user a great deal of latitude in defining the focus of the streak analysis and characterization based on user observation. For instance, the parameters 178 used to focus the analytical process, shown in the panel on the right-hand side of the screen in FIGS. 6 and 8, can be manipulated as the analysis process is carried out to optimize the results, thus allowing the user an opportunity to apply feedback to the system for further tailoring of the results. In this regard, the user may vary: the region of the image to be focused on, e.g. a 1 inch area, a 2 inch area, etc.; the width of the streaks to be considered, e.g. 1 mm, 10 mm, etc.; how many streaks to include in the analysis, e.g. 5, 7, 10, etc.; whether to focus on the most or the least dominant streak in the region; and the like.

The interactive tool provides an add-on mechanism for refining coarse streak characterization or analysis systems or tools. Human interaction is used to first identify that region of an image that may be of interest in a particular scenario, and to further select descriptor values or parameters to be applied in an algorithm to compute streak description tuples. This is done in conjunction with an automated characterization process to provide a more consistent, reliable analysis of the region identified, in accord with the user defined parameters which focus on user observed features and render fine level information. Further, the user may repeat the analysis to include a different focus region or different parameters, or both. Therefore, the interactive tool provided herein takes advantage of the best and most useful portions of the human and automated analysis to generate a streak characterization that can be used for any number of purposes, e.g., troubleshooting and identifying a source and/or type of image artifacts, test procedures, quality control, and many others.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. An interactive method for characterizing printer streaks, the method comprising:
   a. printing an image onto a printable media using a printing system in operable communication with an automated image quality artifact characterization system;
   b. observing the printed image and identifying the presence of at least one image quality artifact in the image;
   c. accessing an interactive tool and operating program integrated with the automated image quality artifact characterization system;
   d. implementing a user focus and selection process within the interactive tool to identify the boundaries of a region of interest within the image including at least a portion of the image quality artifact for characterization;
   e. running the operating program to select the identified region of interest for characterization by the automated image quality artifact characterization system;
   f. generating a one dimensional streak density profile of only the identified region of interest of the image using a two-dimensional characterization data set within the automated image quality artifact characterization system, the density profile representing intensity and color value variation within the selected region of interest of the image;
   g. implementing a user parameter selection process within the interactive tool to select descriptor parameter values to be used by the automated image quality artifact characterization system in characterization of the selected region of interest of the image;
h. inputting the selected parameters into the operating program;
i. operating an automated image-quality characterization algorithm within the automated image quality artifact characterization system that uses the selected parameters to calculate streak characterizing values;
j. repeating steps (c)-(i) based on operator feedback from the calculations of step (i) as many times as necessary to generate a streak characterization of the selected region of interest; and
k. optimizing the printer system according to the generated streak characterization to remove streaks.

2. The method of claim 1, wherein steps (b)-(d) and (g)-(h) are based on human input and feedback provided through the interactive tool to the automated image quality artifact characterization system.

3. The method of claim 1, wherein the automated image-quality characterization algorithm further includes sophisticated algorithms to find precise fine-level descriptors.

4. The method of claim 3, wherein the sophisticated algorithms include algorithms that calculate one or more of signal processing, feature extraction, estimation, and classification.

5. The method of claim 1, further including the step of providing the streak characterization to a diagnostics engine for further use.

6. The method of claim 1, wherein the parameters of step (g) are selected from a group consisting of streak width, number of streaks to be included, streak intensity, and streak dominance or lack thereof.

7. The method of claim 1, wherein the method minimizes subjective characterization of streaks.

8. The method of claim 1, wherein the integrated program is part of a stand-alone processor.

9. The method of claim 1, wherein the step of repeating includes resetting the parameters while the program is still running.

10. The method of claim 1, wherein the interactive tool combines human and automated procedural steps.

* * * * *